(12) United States Patent
Washino (10) Patent No.: US 7,056,154 B2
(45) Date of Patent: Jun. 6, 2006

(54) CONNECTOR AND CONNECTOR UNIT

(75) Inventor: Kiyoshi Washino, Kanagawa (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 10/933,419

(22) Filed: Sep. 3, 2004

(65) Prior Publication Data

US 2005/0085116 A1    Apr. 21, 2005

(30) Foreign Application Priority Data

Sep. 10, 2003  (JP)  ............................ 2003-319058

(51) Int. Cl.
*H01R 24/00*  (2006.01)

(52) U.S. Cl. ...................................... 439/630

(58) Field of Classification Search ............... 439/630, 439/631, 951
See application file for complete search history.

(56) References Cited

U.S. PATENT DOCUMENTS 4,685,031 A * 8/1987 Fife et al. ................... 361/785
6,527,590 B1 * 3/2003 Oguchi ........................ 439/630

FOREIGN PATENT DOCUMENTS

| JP | 2000-48880 | 2/2000 |
|---|---|---|
| JP | 2001-291552 | 10/2001 |
| JP | 2001-357917 | 12/2001 |
| JP | 2002-8755 | 1/2002 |
| JP | 2002-25660 | 1/2002 |
| JP | 2002-63956 | 2/2002 |
| JP | 2002-231344 | 8/2002 |
| JP | 2002-270261 | 9/2002 |
| JP | 2003-217741 | 7/2003 |
| JP | 2003-229189 | 8/2003 |

* cited by examiner

*Primary Examiner*—Javaid H. Nasri
(74) *Attorney, Agent, or Firm*—Rader, Fishman & Grauer PLLC (57) ABSTRACT

A connector is electrically connecting to a memory card which includes a card main body having a plurality of grooves formed on a distal end side thereof and connection terminals disposed on a bottom surface of the grooves of the card main body. The connector includes a housing having a plurality of extension portions fitting to the grooves of the card main body, contacts held by the extension portions of the housing. Each extension portions of the housing has a through-hole. The contact has a base portion fixed by the through-hole, and an elastic portion extending from the fixed portion to the groove and capable of undergoing elastic deformation. The surface of the extension portion of the housing and the surface of the memory card exist substantially on the same level when the grooves of the memory card are fitted to the extension portions of the housing.

6 Claims, 8 Drawing Sheets

CONNECTOR AND CONNECTOR UNIT

CROSS-REFERENCE TO RELATED APPLICATIONS

This application is based upon and claims the benefit of priority from the prior Japanese Patent Application No.2003-319058 filed on Sep. 10, 2003, the entire contents of which is incorporated herein by reference.

1. Field of the Invention

This invention relates to a connector unit. More particularly, the invention relates to a connector and a connector unit that electrically connects to the memory card when the memory card having on-surface connection terminals arranged on a bottom surface of a plurality of penetrating grooves on one of the ends thereof is inserted. The memory card includes an SD (Security Digital) card or a memory stick card, for example.

2. Related Art

A memory card serving as a card storage unit includes flash memory for a storage medium. Since the memory card is extremely small in size and hardly consumes electric power for read/write of data, it has gained a wide application as a recording medium for mobile information apparatuses typified by camera-equipped cell-phone and PDA (Personal Digital Assistance).

Compared with disk type storage devices such as a flexible disk (FD) and an opt-magnetic disk (MO), it has been believed that the memory card has a smaller storage capacity and is more expensive. However, the memory capacity of the memory card has reached a large memory capacity of about 128 MB and its price has become lower due to the recent progress of technologies and due to mass production effect with the popularization of the apparatuses using the memory card.

The memory card does not need a driving device for reading/writing data unlike the FD and the MO. Because of this merit, the memory card is suitable as a storage medium for a digital camera, a notebook type personal computer and a portable music player for which consumed power and portability are of importance.

A connector that improves impact resistance and freedom of arrangement of connectors and can be inserted from a direction opposing a packaging wiring substrate has been invented as a connector for reading and writing data from and to such a memory card (JP-A-2002-231344, for example).

The connector described above includes a connector main body packaged onto a packaging wiring substrate of an appliance and a cover member made of a metal. A card fitting space is formed in the connector main body. A contact portion of each contact protrudes from one of the end portions of the card fitting space. A restriction member for restricting one of the ends of the memory card is fixed in the proximity of this contact portion. One of the ends of the flash memory card is inserted below the restriction member, the memory card is fitted into the card fitting space and the cover member is then closed. The cover member is locked in this way to the connector main body.

However, the connector for a memory card according to the patent document 1 is not free from the problem that it is not suitable for an electronic appliance for which further reduction of height is required because the connector main body is fitted to the printed substrate, the cover member is further fitted to the connector main body and the overall height of the connector thus becomes great.

An extremely low height is required for a connector for a memory card fitted to a DVC (Digital Video Camera) for business purposes, for example. In addition, because an external storage capacity is great such as in the case of image data, a novel connector unit for a memory card that can arrange a plurality of memory cards inside a limited area has also been required.

On the other hand, because the frequency of removing the memory card is extremely small in the case of the memory card fitted to this DVC for business purposes, the memory card is released from one of the factors that impede the reduction of the height and the achievement of high packaging density of the connector for the memory card.

SUMMARY OF THE INVENTION

To solve the problems described above, the invention is directed to provide a connector and a connector unit that accomplish a low height and a high packaging density of an overall connector inclusive of the memory card.

To accomplish the object described above, the inventor of the invention has invented the following novel connector and connector unit for a memory card.

(1) A connector for electrically connecting to a memory card, the memory card including a card main body having a plurality of grooves formed and aligned on a distal end side thereof and connection terminals disposed on each of bottom surface of the grooves of the card main body, the connector comprising: a housing having a plurality of extension portions fitting to the grooves of the card main body; and contacts held by the extension portions of the housing; wherein each of the extension portions of the housing has a through-hole each of the contacts has a base portion fixed by the through-hole of the extension portion and an elastic portion extending from the fixed portion to the groove of the card main body and capable of undergoing elastic deformation; and each of the surface of the extension portions of the housing and the surface of the memory card exist substantially on the same level when the grooves of the memory card are fitted to the extension portions of the housing.

(2) A connector unit for electrically connecting to a memory card, the memory card including a card main body having a plurality of grooves formed and aligned on a distal end side thereof and connection terminals disposed on a bottom surface of the grooves of the card main body, the connector unit comprising: a printed substrate; a housing disposed on the printed substrate and having a plurality of extension portions fitting to the grooves of the card main body; and contacts held by the extension portions of the housing; wherein: each of the extension portions of the housing has a through-hole; each of the contacts has a base portion fixed by the through-hole of the extension portion and an elastic portion extending from the fixed portion to the groove of the card main body and capable of undergoing elastic deformation; and the surface of the extension portion of the housing and the surface of the memory card exist substantially on the same level when the groove of the memory card is fitted to the extension portion of the housing.

The memory card is so shaped into a card shape as to possess a card main body having a plurality of grooves defined and aligned on the distal end thereof and sealing a memory chip to a card type outer shell and connection terminals disposed on a bottom surface of the grooves of the card main body. The memory card inserted into the connector for a memory card and the connector unit for a memory card according to the invention includes an SD card or a memory stick card.

The connector for a memory card includes a housing having a plurality of extension portions fitting to the grooves of the card main body and contacts each held by each extension potion of the housing. The housing can be molded from an insulating synthetic resin material. A plurality of extension portions fitting to a plurality of grooves formed in the memory card is shaped in a comb tooth shape at an upper part of the housing. Each of these extension portions of the housing has a fitting width that fits to the width of the grooves of the memory card and a thickness approximate to the depth of the grooves of the housing. A through-hole is defined in each extension portion of the housing.

Individual extension portions among a plurality of extension portions of the housing sometimes have a different fitting width and a different extension length depending on the corresponding grooves. When a plurality of extension portions of the housing is inserted into a plurality of grooves of the memory card, the memory card and the housing are positioned to each other. The housing is fitted to a printed substrate on which the memory card is put and the upper surface of the extension portions of the housing has substantially the same height as the upper surface of the memory card. Therefore, the extension portions of the housing have a function of preventing erroneous insertion of the memory card, too.

A cantilever contact includes a base portion fixed by the through-hole of each extension portion of the housing and an elastic portion extending from the fixed portion to the groove of the card main body and capable of undergoing elastic deformation. A plurality of cantilever contacts is arranged and aligned in a direction crossing orthogonally the insertion direction of the memory card. The fixed portion of each cantilever contact is pushed into and held by the housing, for example. An edge of the fixed portion is a tab soldered to the printed substrate and bears the role of holding the housing to the printed substrate.

The elastic portion of each cantilever contact extends into the through-hole defined in the extension portion of the housing. The distal end of the elastic portion of the cantilever contact is a bending end and operates as a contact with each on-surface connection terminal of the memory card. Since those contacts protrude to the lower surface of the extension portion of the housing, the contact pushes the on-surface connection terminal of the memory card inserted into the extension portions of the housing. Incidentally, since the distal end of the extension portion of the housing seals the distal end of the cantilever contact, it prevents collision of the memory card erroneously inserted against the cantilever contact and protects the memory card from breakage.

In the connector and the connector unit, the memory card is inserted with its on-surface connection terminals facing up. In other words, the memory card is inserted in such a manner that its on-surface connection terminals oppose the lower wall of the extension portions of the housing. Because a plurality of cantilever contacts pushes the on-surface connection terminals at the insertion position of the memory card, electric connection of the memory card can be established.

The upper surface of the memory card inserted into the memory card insertion port exists substantially on the same level as the upper surface of a plurality of extension portions of the housing. The thickness of such a connector and a connector unit is substantially the sum of the thickness of the printed substrate and the thickness of the memory card as the overall thickness of the connector. Therefore, the thickness can be reduced to its limit.

(3) A connector unit as described in (2), wherein a pair of housings is used and arranged adjacent to each other on the printed substrate.

According to this invention, the housing is the one that is arranged in juxtaposition and molded integrally.

The cantilever contact is constituted by a fixed portion and an elastic portion. Each set of the fixed portions of the cantilever contacts is held by the housing integrally bonded. The elastic portion of the cantilever contact is arranged inside the through-hole defined in each extension portion of the housing in such a manner as to be capable of undergoing elastic deformation. A contact of the cantilever contact with the on-surface connection terminal of the memory card protrudes to the lower surface of the extension portions of the housing.

The housing so bonded integrally is fitted to the printed substrate. Tandem card insertion ports are defined by the upper surface of the printed substrate and a plurality of extension portions of the housing. The upper surface of the memory cards inserted into the tandem card insertion ports exists substantially on the same level as the upper surface of a plurality of extension portions.

In the connector unit for a memory card in this embodiment, the on-surface connection terminals of two memory cards are inserted while facing up. In other words, the memory cards are inserted in such a manner that the on-surface connection terminals of the memory cards oppose the lower wall of the extension portions. A plurality of cantilever contacts of the housing pushes the on-surface connection terminals at the fitting positions of the memory cards and electric connection of the memory cards can be established.

The upper surface of the memory card inserted into the card insertion port exists substantially on the same level as the upper surface of a plurality of extension portions of the housing. The overall thickness of the connector for a memory card and the connector of the connector unit is substantially the sum of the thickness of the printed substrate and the thickness of the memory card. Therefore, the thickness can be reduced almost to the limit.

The two memory cards described above are arranged in parallel and adjacent to each other in the housing integrally bonded. Therefore, the two memory cards can be arranged in a limited area.

(4) A connector unit as described in (3), wherein two sets of the pair of housings are used and arranged adjacent to each other in such a manner as to face each other.

(5) A connector unit as described in (4), wherein a pair of inner walls coming into contact with side surfaces of each memory card is provided to the printed substrate, and the connector unit further comprises a frame plate covering the inner walls, the housing, the contact and the memory card.

(6) A connector unit as described in (5), wherein the frame plate has a thin sheet cover coming into contact with the memory card.

(7) A connector as described in (1), wherein the memory card is an SD card or a memory stick card.

(8) A connector unit as described in any of (2) to (6), wherein the memory card is an SD card or a memory stick card.

In the connector unit in this preferred embodiment, the on-surface connection terminals of the four memory cards are inserted while facing up. In other words, the memory cards are inserted in such a manner that the on-surface connection terminals of the memory cards oppose the lower wall of the extension portions. Therefore, because a plurality of cantilever contacts of the housing pushes the on-surface connection terminals at the fitting positions of the memory cards, electric connection of the memory cards can be established.

The upper surface of the four memory cards inserted into the card insertion ports exist substantially on the same level as the upper surface of a plurality of extension portions of the housings. Because the overall thickness of this connector unit is substantially the sum of the thickness of the printed substrate and the thickness of the memory card, the reduction of the thickness can be achieved to the limit.

Further, two memory cards are arranged close to each other in juxtaposition on the housing integrally bonded and the housing integrally bonded is arranged adjacent to each other in such a manner as to oppose each other. Therefore, four memory cards can be arranged in a limited area.

In a preferred embodiment, the connector unit for a memory card includes housings so arranged as to oppose each other and integrally bonded and a frame plate encompassing the housings and the memory cards under the state where all the memory cards are inserted. The opposing inner walls of the frame plate restrict the side surfaces of the memory cards. The frame plate has the same thickness as that of the memory cards and is fitted to the printed substrate.

In a preferred embodiment, a thin sheet cover coming into contact with the upper surface of the memory cards is fitted to the frame plate. When the connector units for a memory card having such frame plate and thin sheet cover are stacked in multiple stages, the connector units can be fitted to a DVC for business purposes in a limited capacity.

The memory card to which the connector for a memory card and the connector unit for a memory card are applied includes an SD card or a memory stick card.

The overall thickness of the connector and the connector unit according to the invention is substantially the sum of the thickness of the printed substrate and the thickness of the memory card. Therefore, the thickness can be reduced to the limit.

In the connector unit according to the invention, two memory cards are arranged adjacent to each other in juxtaposition. Therefore, these two memory cards can be arranged in a limited area.

Alternatively, in the connector unit according to the invention, two memory cards arranged adjacent to each other in juxtaposition are arranged adjacent to each other in juxtaposition in such a manner as to oppose each other. Therefore, four memory cards can be arranged in a limited area.

DESCRIPTION OF THE PREFERRED EMBODIMENT

Preferred embodiments of the invention will be hereinafter explained with reference to the accompanying drawings.

Figure 1A:
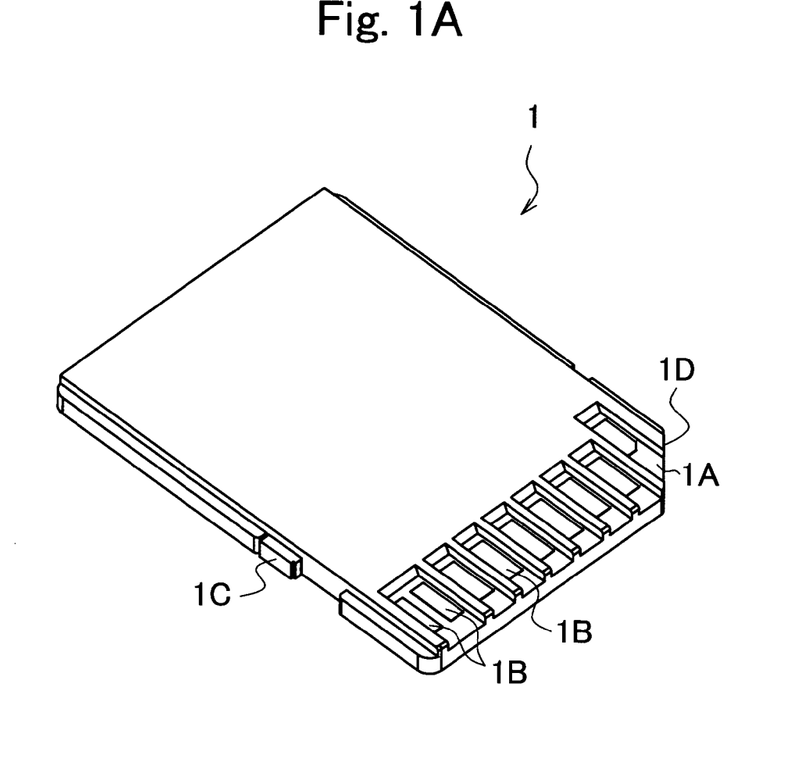
FIG. 1A is a perspective view of a connector and a memory card inserted into a connector unit according to an embodiment of the invention when the memory card is viewed from a back surface side.
Figure 1B:
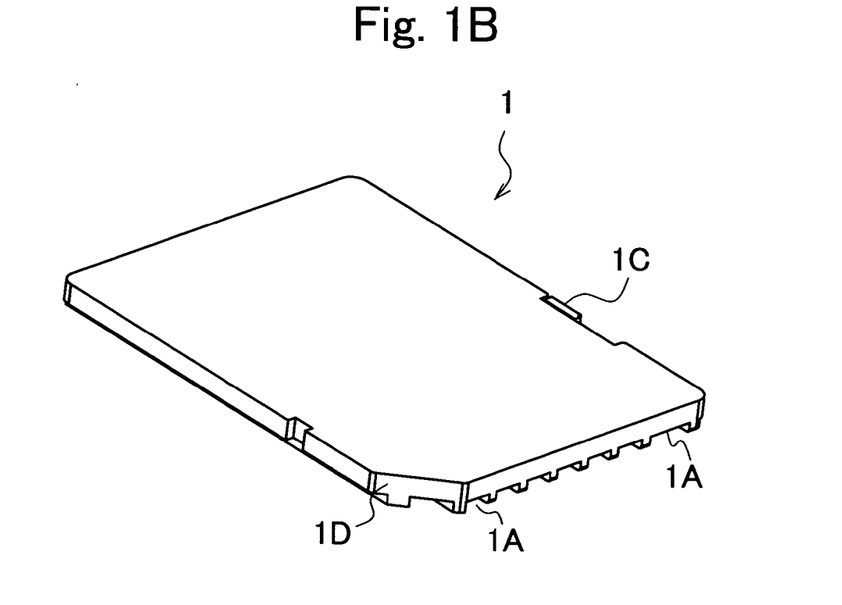
FIG. 1B is a perspective view when the memory card according to the embodiment is viewed from a surface side.

FIG. 1 is a perspective view showing a memory card inserted into a connector and into a connector unit (hereinafter called briefly "connector" and "connector unit", respectively) according to an embodiment of the invention. FIG. 1A is a perspective view when the memory card 1 is viewed from a back surface side and FIG. 1B is a perspective view when the memory card 1 is viewed from a surface side.

FIG. 1 shows an embodiment wherein the memory card 1 is formed of an insulating synthetic resin material into a rectangular shape. The memory card 1 includes a card main body and eight grooves 1A reaching one of the ends of the card main body. Nine on-surface connection terminals 1B are arranged on a bottom surface of these eight grooves 1A. These on-surface connection terminals 1B are electrically connected to an IC chip built in the memory card 1 and operate as a flash memory.

Two on-surface connection terminals 1B are arranged on the bottom surface of the broad groove 1A at the extreme left of the memory card 1 as shown in FIG. 1A. The on-surface connection terminals 1B are arranged on the bottom surface of the other grooves 1A having the same width in such a manner as to correspond to the grooves 1A on the 1:1 basis.

The groove 1A at the extreme right has a greater depth than the other grooves 1A as shown in FIG. 1A. The eight grooves 1A have the same depth from the back surface. On the other hand, nine on-surface connection terminals 1B shaped into the rectangle have different shapes and different fitting positions among them.

A write protect switch 1C is disposed on the left side of the memory card 1. This write protect switch 1C is changed over so as to inhibit or permit write to the flash memory. A chamfer portion 1D for preventing erroneous insertion is formed at an angle of 45 degrees at one of the corners of the memory card 1.

Figure 2A:
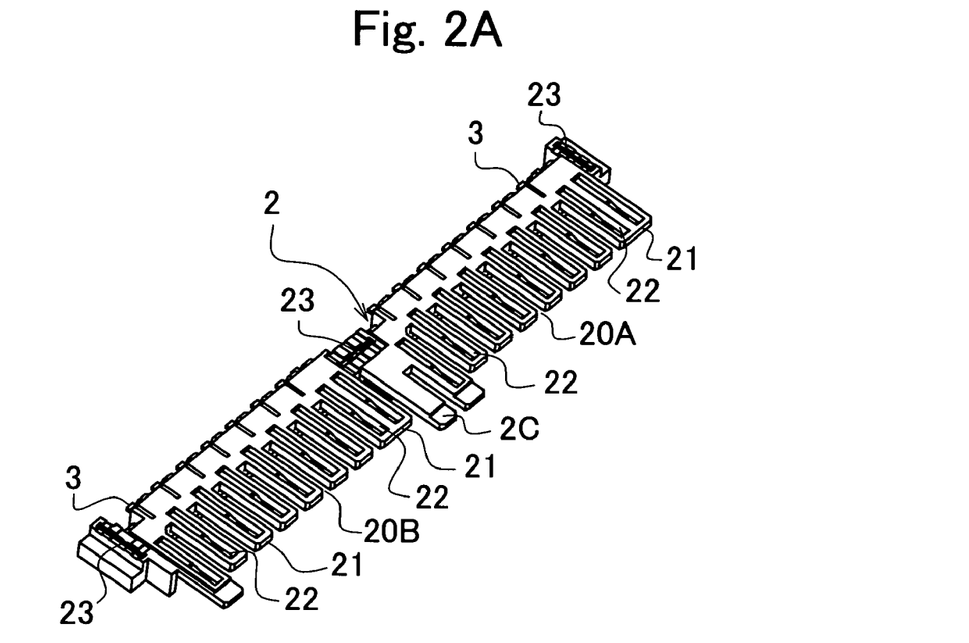
FIG. 2A is a perspective view when housing according to the embodiment is viewed from the surface side.
Figure 2B:
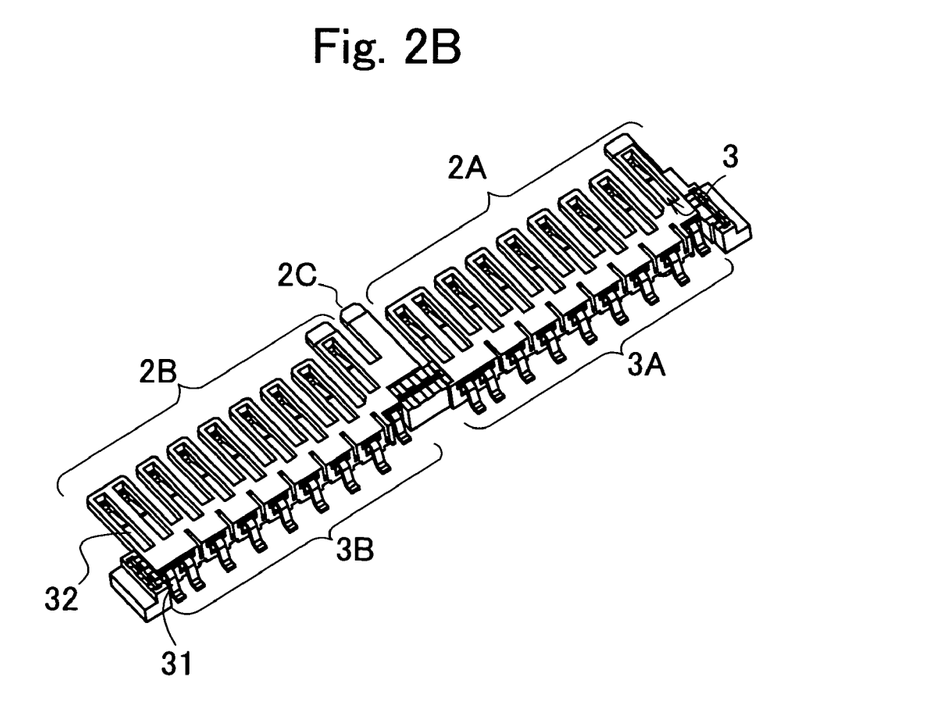
FIG. 2B is a perspective view when the housing according to the embodiment is viewed from the back surface side.

Next, FIG. 2 shows a partial construction of the connector according to the invention. FIG. 2 is a perspective view of housing 2 according to the invention. FIG. 2A is a perspective view of the housing 2 when viewed from the insertion side of the memory card 1 shown in FIG. 1 and FIG. 2B is a perspective view of the housing 2 shown in FIG. 2A when it is viewed from the back surface side.

The housing 2 is formed of an insulating synthetic resin material as shown in FIG. 2. The housing 2 has a plurality of extension portions 21 into which a plurality of grooves 1A of the memory card 1 shown in FIG. 1 fits.

These extension portions 21 are dividedly arranged as a first extension portion group 2A and a second extension portion group 2B as shown in FIG. 2. In the first extension portion group 2A, eight extension portions 21 have a fitting width that fits to the width of the eight grooves 1A shown in FIG. 1 and a thickness approximate to the depth of these eight grooves.

Similarly, in the second extension portion group 2B, eight extension portions 21 have a fitting width that fits to the width of the eight grooves 1A shown in FIG. 1 and a thickness approximate to the depth of these eight grooves. The housing 2 is integrally molded so that the memory cards 1 shown in FIG. 1 can be arranged in parallel with and close to one another.

Incidentally, a transverse plate 2C protrudes from between the first extension portion group 2A and the second extension portion group 2B. The transverse plate 2C partitions two memory cards 1 fitted into the housing 2 and partially guides or restricts the side surfaces of these memory cards 1.

On the other hand, each cantilever contact 3 shown in FIG. 2 includes a fixed portion 31 and an elastic portion 32. The fixed portion 31 is held by the housing 2. The elastic portion 32 is arranged inside a through-hole 22 formed in each extension portion 21 in such a manner as to be capable of undergoing elastic deformation. These cantilever contacts 3 are divided into a first cantilever contact group 3A and a second cantilever contact group 3B in such a manner as to correspond to the first and second extension portion groups 2A and 2B, respectively.

Figures 3A, 3C:
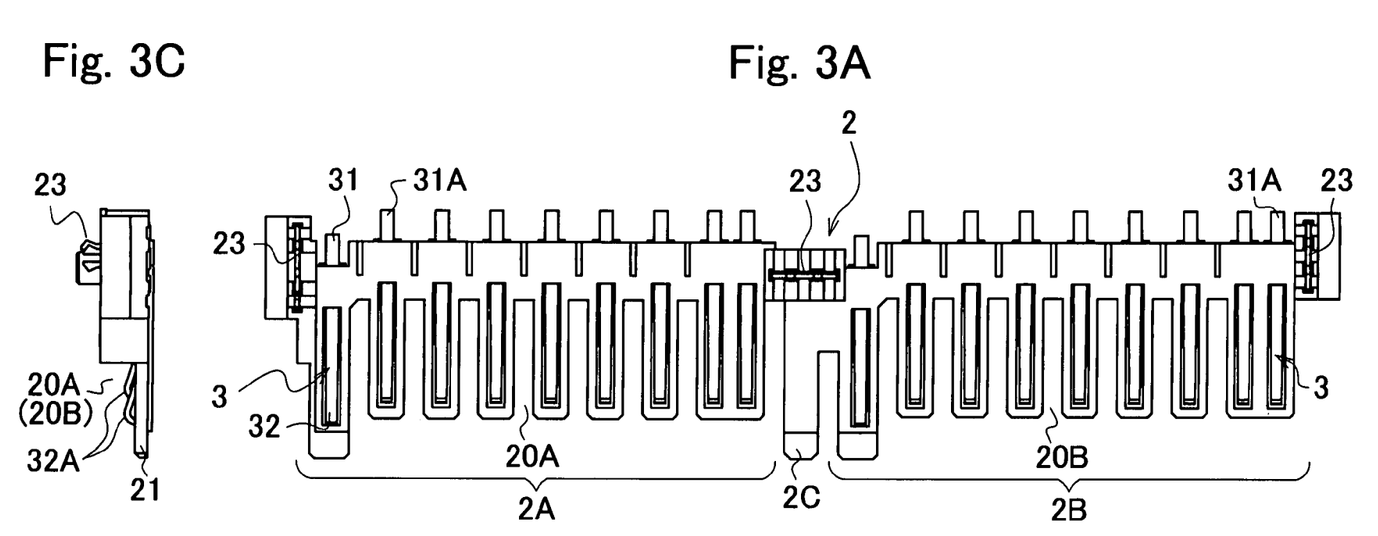
FIG. 3A is a plan view of the housing according to the embodiment.
FIG. 3C is a left-hand side view of the housing according to the embodiment.
Figure 3B:
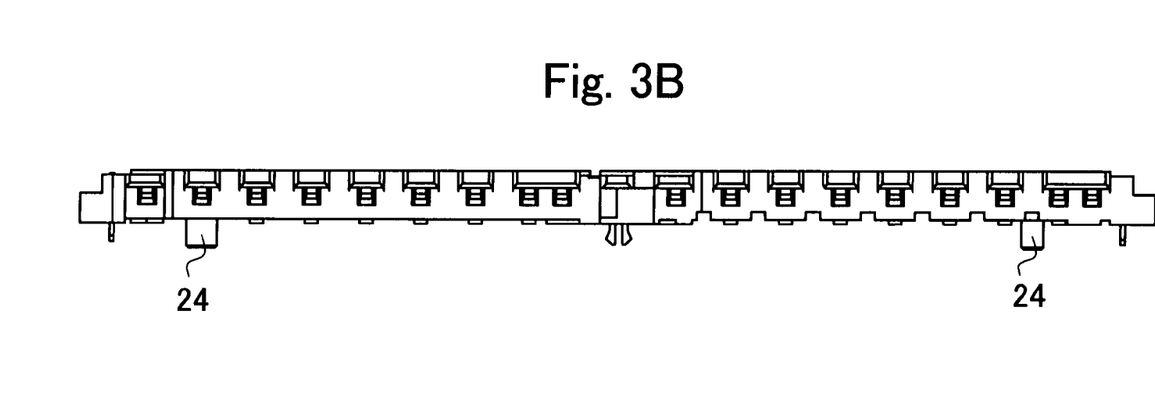
FIG. 3B is a front view of the housing according to the embodiment.

Next, the construction of the housing 2 will be further explained with reference to FIG. 3. FIG. 3A is a plan view of the housing 2. FIG. 3B is a front view of FIG. 3A and FIG. 3C is a left-hand side view of FIG. 3A.

In the elastic portion 32 of each of the cantilever contacts 3, the contact 32A with the on-surface connection terminal 1B shown in FIG. 1 protrudes to the lower surface of the extension portion 21. On the other hand, the end of the fixed portion 31 of each cantilever contact 3 forms a bonding tab 31A that protrudes backward to the housing 2 and is to be soldered.

As shown in FIG. 3, further, snap rings 23 are pushed into both wings of the housing 2 and into its center. These snap rings 23 are used for fitting the housing 2 to a later-appearing printed substrate 5. Furthermore, two pins 24 protrude from the bottom surface of the housing 2 for the purpose of positioning with the later-appearing printed substrate 5.

The printed substrate 5 to be later described is fitted to the bottom surface of the housing 2 as shown in FIG. 3. Tandem card insertion ports 20A and 20B are defined by the upper surface of the printed substrate 5 and the plurality of extension portions 21.

Figure 4:
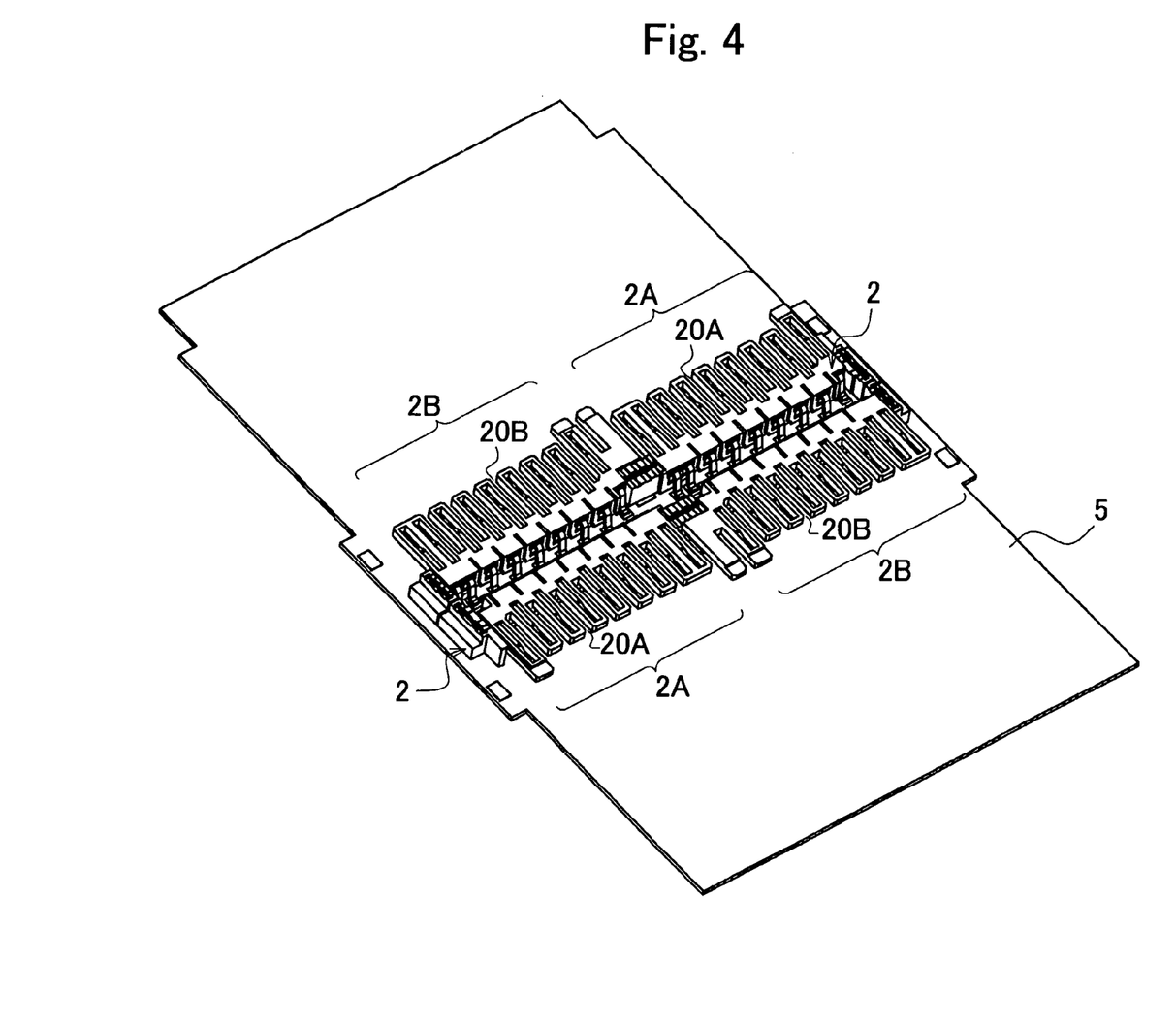
FIG. 4 is a perspective view showing a construction of the connector unit for the memory card according to the embodiment.

Next, the construction of the connector unit according to the invention will be explained with reference to a perspective view of FIG. 4. As shown in FIG. 4, two housings having the first and second extension portion groups 2A and 2B are arranged on the printed substrate 5 in symmetry of line so that the tandem card insertion ports 20A and 20B oppose each other. The two housings 2 are arranged close to each other as shown in FIG. 4.

Four memory cards 1 shown in FIG. 1 can be connected to the connector unit of the embodiment shown in FIG. 4. However, there is the case where the first cantilever contact group 3A (see FIG. 2) is arranged in the housing having the first extension portion group 2A and the printed substrate is fitted to this housing in the connector unit. Alternatively, there is the case where only either one of the housings 2 shown in FIG. 4 is fitted to the printed substrate.

Next, the operation of the connector unit according to the invention will be explained with reference to a state change diagram of FIG. 5. FIG. 5 is a partial longitudinal sectional view of FIG. 4.

Figure 5A:
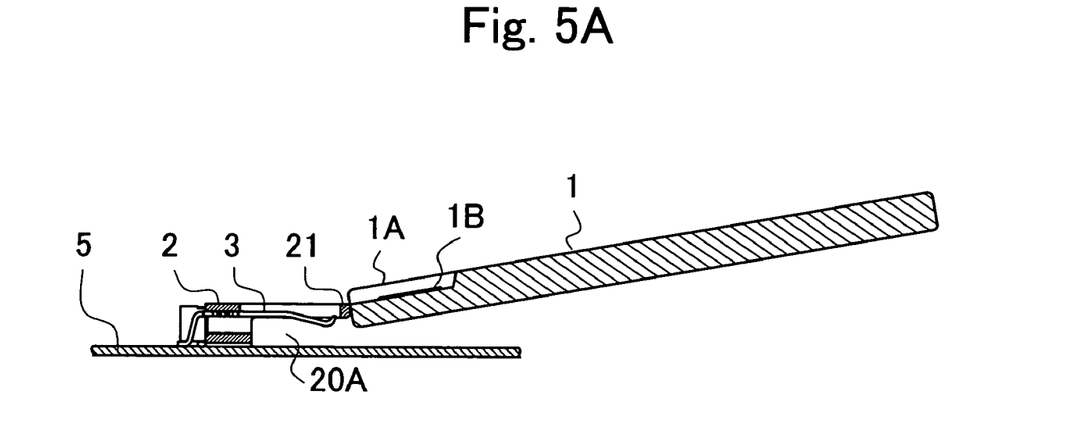
FIG. 5A is a state diagram when the memory card is inserted into the connector unit.

FIG. 5A is a state diagram before the memory card 1 is inserted into the connector unit. The memory card 1 is fitted with the on-surface connection terminal 1B facing up. FIG. 5 shows the state where the memory card 1 cannot be fitted into the connector unit because the end face of the memory card 1 strikes the front wall of the extension portion 21 in FIG. 5A.

Incidentally, the distal end of this extension portion 21 seals the distal end of the cantilever contact 3 as shown in FIG. 5A. Therefore, the memory card 1 that is erroneously inserted is prevented from affecting against the cantilever contact 3 and can be protected from breakage, for example.

Figure 5B:
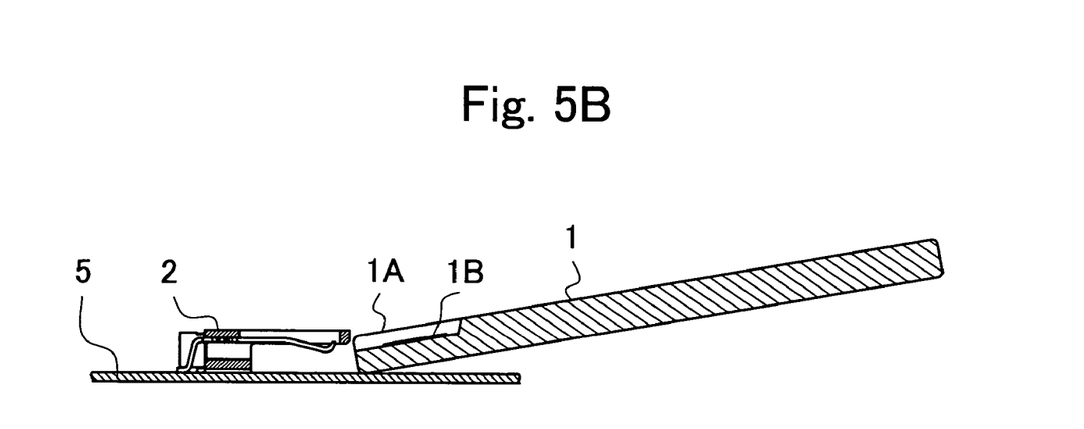
FIG. 5B is a state diagram immediately before the memory card is inserted into the connector unit.

FIG. 5B is a state diagram immediately before the memory card 1 is fitted into the connector unit. The formation end of the grooves 1A of the memory card 1 is put on the printed substrate 5 while the memory card 1 is kept inclined with the grooves 1A facing up. When the memory card 1 is inserted into the housing 2 from the state shown in FIG. 5B, the state attains the state shown in FIG. 5C.

Figure 5C:
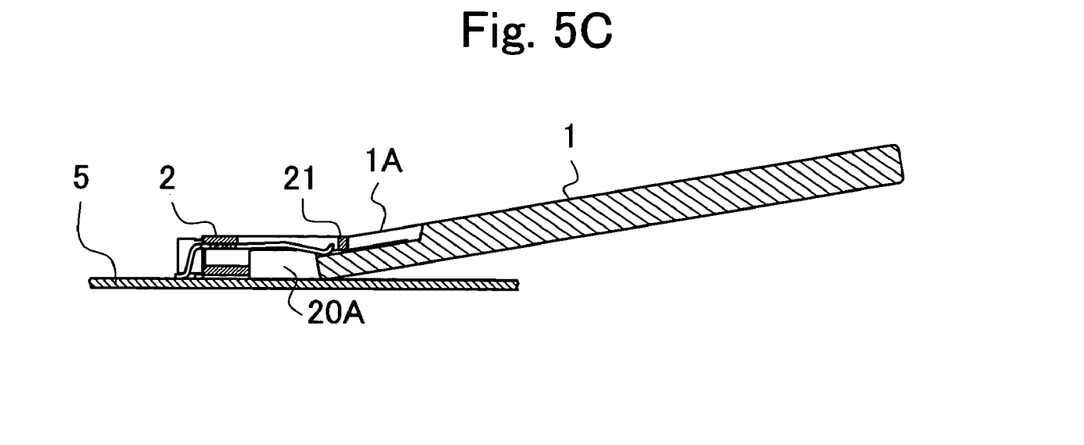
FIG. 5C is a state diagram when a groove of the memory card is fitted into a distal end portion of an extension portion.

FIG. 5C is a state diagram when the groove 1A of the memory card 1 fits to the distal end of the extension portion 21. The inclination of the memory card 1 is mitigated from the state shown in FIG. 5C so that the memory card 1 becomes parallel to the printed substrate 5 and the memory card 1 is inserted into the housing 2. The state then attains the state shown in FIG. 5D.

Figure 5D:
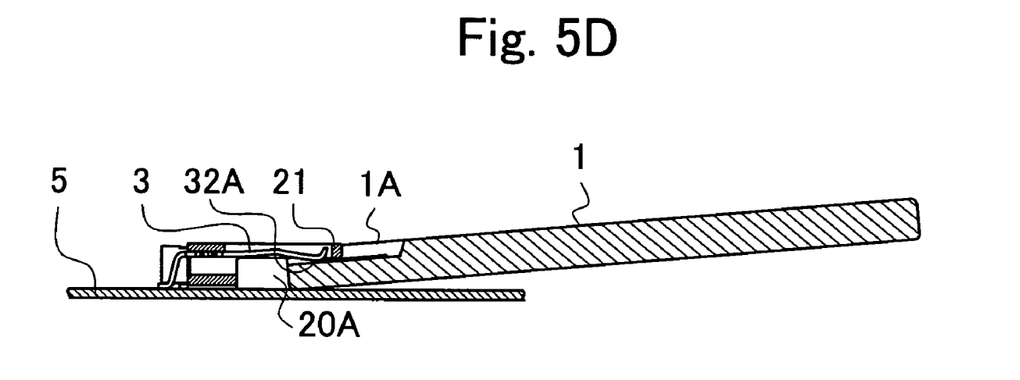
FIG. 5D is a state diagram when a formation end of the memory card is fitted into an intermediate part of a card insertion port.

FIG. 5D is a state diagram where the formation end of the groove 1A of the memory card 1 is inserted to its intermediate part into the card insertion port 20A constituted by the upper surface of the printed substrate 5 and a plurality of extension portions 21. Under the state shown in FIG. 5D, the bottom surface of the groove 1A keeps contact with the contact 32A of the cantilever contact 3. The memory card 1 is put on the printed substrate 5 from the state shown in FIG. 5D and is further inserted towards the housing 2, reaching the state shown in FIG. 5E.

Figure 5E:
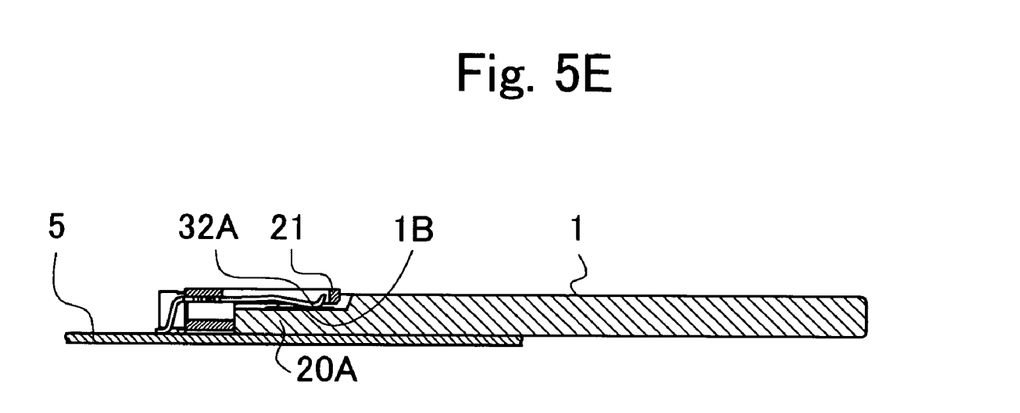
FIG. 5E is a state diagram when the memory card is completely inserted into the card insertion port.

FIG. 5E is a state diagram where the memory card 1 is completely inserted into the card insertion port 20A shown in FIG. 5D. The contact 32A of the cantilever contact 3 pushes the on-surface connection terminal 1B so that the memory card 1 and the connector unit can be electrically connected.

As shown in FIG. 5E, the upper surface of the memory card 1 inserted into the card insertion port 20A keeps a level substantially equal to the upper surface of a plurality of extension portions 21. The thickness of such a connector unit can be decreased substantially to its limit because the whole thickness of the connector unit is substantially the sum of the thickness of the printed substrate 5 and the thickness of the memory card 1.

Figure 6:
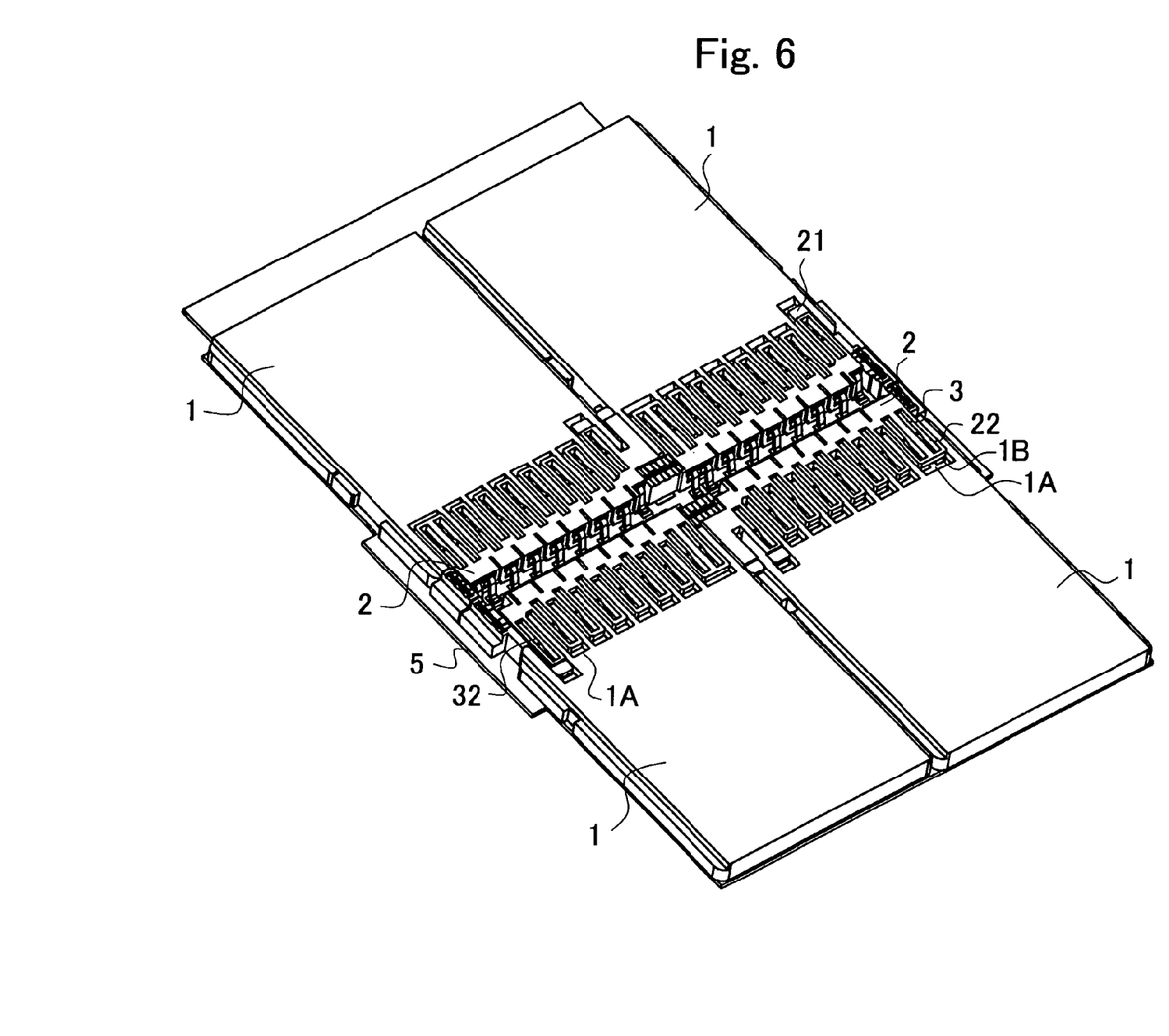
FIG. 6 is a perspective view showing the state where four memory cards are inserted into the connector unit according to the invention.

FIG. 6 is a state diagram where four memory cards 1 are inserted into the connector unit shown in FIG. 4 in accordance with the procedure shown in FIG. 5. As shown in the perspective view of FIG. 6, two memory cards 1 are juxtaposed adjacent to each other. Further, the other two memory cards 1 juxtaposed with the former two are so arranged adjacent to each other as to face each other. Therefore, four memory cards 1 can be arranged in a limited area in the connector unit according to the invention.

Figure 7:
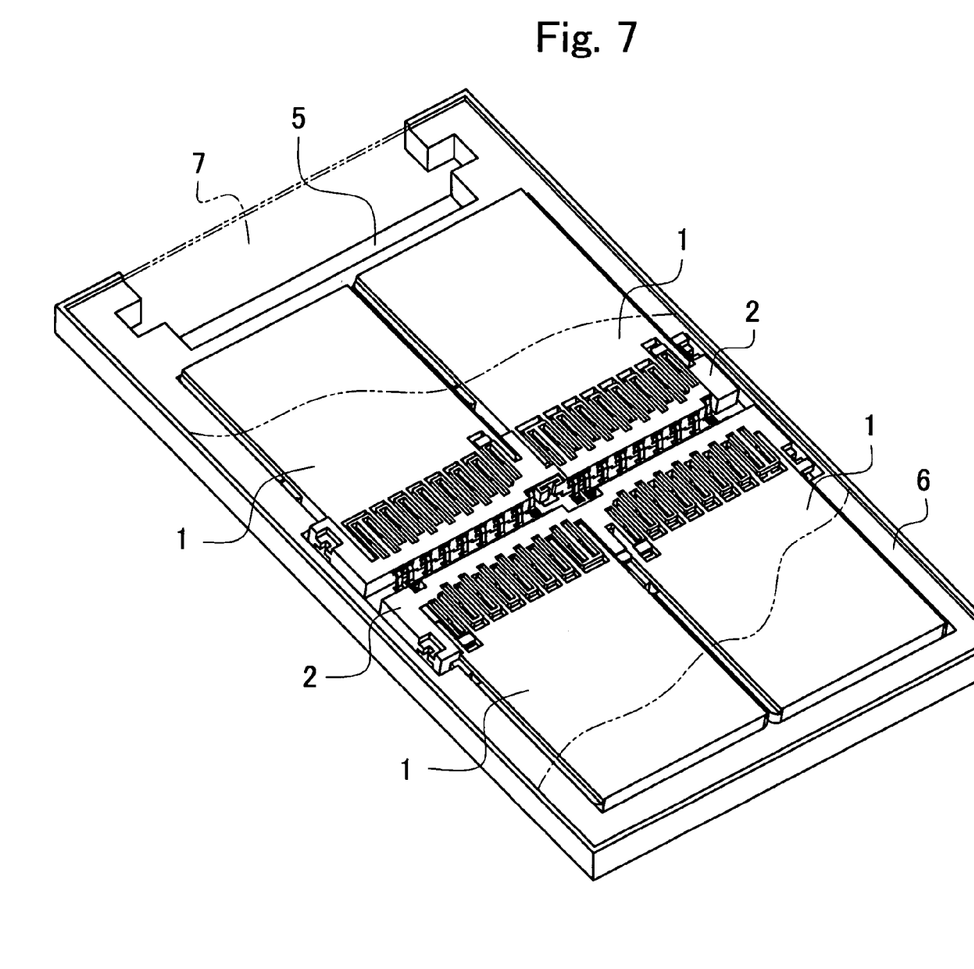
FIG. 7 is a perspective view showing the state where a frame plate is further fitted to the connector unit according to the invention.

In another preferred embodiment, a frame plate encompassing the four memory cards 1 shown in FIG. 6 may be disposed. FIG. 7 is a perspective view of the connector unit obtained by further fitting the frame plate 6 to the connector unit shown in FIG. 6.

In the embodiment shown in FIG. 7, the connector unit includes the frame plate 6 encompassing the housings 2 and the memory cards 1 under the state where all the memory cards 1 are inserted into the housings 2 so arranged as to face each other.

In FIG. 7, the opposing inner walls of the frame plate 6 restrict the side surfaces of the memory cards 1. The frame plate 6 has the same thickness as the memory cards 1 and is fitted to the printed substrate 5. The frame plate 6 prevents the memory cards 1 inserted into the housings 2 from moving back and forth and to the right and left.

In still another preferred embodiment, a thin sheet cover 7 keeping contact with the upper surfaces of the memory cards 1 may well be fitted to the frame plate 6 shown in FIG. 7. The connector units including the frame plate 6 and the thin sheet cover 7 shown in FIG. 7 can be stacked in multiple stages (10 stages, for example) and can be mounted in a limited capacity to a DVC for business purposes.

Referring to FIG. 7, each memory card 1 has a memory capacity of about 1 GB, for example. When four sets of memory cards 1 having this memory capacity are mounted in 10 stages to the DVC for business purposes, for example, the DVC for business purposes has an external storage device having a memory capacity of 40 GB.

What is claimed is:

1. A connector for electrically connecting to a memory card, the memory card including a card main body having a plurality of grooves formed and aligned on a distal end side thereof and connection terminals disposed on each of bottom surface of the grooves of the card main body, the connector comprising:

a housing having a plurality of extension portions fitting to the grooves of the card main body; and contacts held by the extension portions of the housing; wherein each of the extension portions of the housing has a through-hole and a thickness similar to the depth of the grooves of the card main body;

each of the contacts has a base portion fixed by the through-hole of the extension portion and an elastic portion extending from the fixed portion to the groove of the card main body and capable of undergoing elastic deformation; and each of the surface of the extension portions of the housing and the surface of the memory card exist substantially on the same level when the grooves of the memory card are fitted to the extension portions of the housing.

2. A connector unit for electrically connecting to a memory card, the memory card including a card main body having a plurality of grooves formed and aligned on a distal end side thereof and connection terminals disposed on a bottom surface of the grooves of the card main body, the connector unit comprising:

a printed substrate;

a housing disposed on the printed substrate and having a plurality of extension portions fitting to the grooves of the card main body; and contacts held by the extension portions of the housing; wherein:

each of the extension portions of the housing has a through-hole and a thickness similar to the depth of the grooves of the card main body;

each of the contacts has a base portion fixed by the through-hole of the extension portion and an elastic portion extending from the fixed portion to the groove of the card main body and capable of undergoing elastic deformation; and the surface of the extension portion of the housing and the surface of the memory card exist substantially on the same level when the groove of the memory card is fitted to the extension portion of the housing.

3. A connector unit as defined in claim 2, wherein a pair of the housings is used and arranged adjacent to each other on the printed substrate.

4. A connector unit as defined in claim 3, wherein two sets of the pair of housings are used and arranged adjacent to each other in such a manner as to face each other.

5. A connector unit as defined in claim 4, wherein a pair of inner walls coming into contact with side surfaces of each of the memory cards is provided to the printed substrate, and the connector unit further comprises a frame plate covering the inner walls, the housing, the contact and the memory card.

6. A connector unit as defined in claim 5, wherein the frame plate has a thin sheet cover coming into contact with the memory card.

* * * * *